(12) United States Patent
Yoshio et al.

(10) Patent No.: US 7,783,158 B2
(45) Date of Patent: Aug. 24, 2010

(54) INFORMATION RECORD MEDIUM, APPARATUS FOR RECORDING THE SAME AND APPARATUS FOR REPRODUCING THE SAME

(75) Inventors: Junichi Yoshio, Tokorozawa (JP); Ryuichiro Yoshimura, Tokorozawa (JP); Takao Sawabe, Tokyo-to (JP); Yoshiaki Moriyama, Tsurugashima (JP); Kaoru Yamamoto, Tsurugashima (JP); Akihiro Tozaki, Tsurugashima (JP); Hiroshi Nakamura, Tokorozawa (JP)

(73) Assignee: Pioneer Electronic Corporation, Tokyo (JP)

( * ) Notice: Subject to any disclaimer, the term of this patent is extended or adjusted under 35 U.S.C. 154(b) by 946 days.

(21) Appl. No.: 11/311,359

(22) Filed: Dec. 20, 2005

(65) Prior Publication Data
US 2006/0093324 A1 May 4, 2006

Related U.S. Application Data

(63) Continuation of application No. 09/731,653, filed on Dec. 8, 2000, now Pat. No. 7,035,529, which is a continuation of application No. 08/834,806, filed on Apr. 3, 1997, now Pat. No. 6,215,952.

(30) Foreign Application Priority Data
Apr. 4, 1996 (JP) .................................. P08-82932

(51) Int. Cl.
*H04N 5/91* (2006.01)
(52) U.S. Cl. ........................... 386/94; 386/95; 386/125; 386/126
(58) Field of Classification Search .................... 386/46, 386/52, 94, 95, 125, 126; 360/60; 380/201, 380/203
See application file for complete search history.

(56) References Cited

U.S. PATENT DOCUMENTS 5,172,111 A 12/1992 Olivo, Jr.

(Continued)

FOREIGN PATENT DOCUMENTS

EP 0597 580 5/1994

(Continued)

OTHER PUBLICATIONS

Patent Abstracts of Japan of Japanese Publication No. 05-101399, published Apr. 23, 1993.

*Primary Examiner*—John W. Miller
*Assistant Examiner*—Christopher Onuaku
(74) *Attorney, Agent, or Firm*—Drinker Biddle & Reath LLP

(57) ABSTRACT

An information record medium having a record track recorded with at least video information is to be reproduced by a reproducing apparatus, which has a read device and reproduces at least video information while relatively moving the read device along the record track. At least video information and control information comprising access information to access the video information are recorded on the record track and are each divided into a plurality of first data groups, each of which is a unit accessible by the reproducing apparatus and comprises the video and control informations. Management information including (i) reproduction procedure information and (ii) a plurality of first search prohibit informations, is collectively recorded at one portion of the record track for each of the second data groups.

24 Claims, 14 Drawing Sheets

U.S. PATENT DOCUMENTS

| | | | |
|---|---|---|---|
| 5,315,448 A * | 5/1994 | Ryan | 386/94 |
| 5,434,678 A | 7/1995 | Abecassis | |
| 5,715,224 A | 2/1998 | Fujinami | |
| 5,813,010 A | 9/1998 | Kurano et al. | |
| 5,819,004 A | 10/1998 | Azadegan et al. | |
| 5,870,523 A * | 2/1999 | Kikuchi et al. | 386/95 |
| 5,881,203 A | 3/1999 | Fujinami et al. | |
| 5,963,909 A | 10/1999 | Warren et al. | |
| 5,991,500 A * | 11/1999 | Kanota et al. | 386/94 |
| 6,215,952 B1 * | 4/2001 | Yoshio et al. | 386/94 |
| 6,904,090 B2 * | 6/2005 | Sugahara | 386/94 |
| 7,035,529 B2 * | 4/2006 | Yoshio et al. | 386/94 |

FOREIGN PATENT DOCUMENTS

| | | |
|---|---|---|
| EP | 0 677 961 | 10/1995 |
| EP | 0 685 845 | 12/1995 |
| EP | 0 686 973 A1 | 12/1995 |
| EP | 0 696 798 A1 | 2/1996 |
| EP | 0 724 264 | 7/1996 |
| EP | 0 737 980 | 10/1996 |
| EP | 0 788 106 A1 | 8/1997 |
| EP | 0 795 869 | 9/1997 |
| WO | WO 95/12274 | 5/1995 |
| WO | WO 95/12276 | 5/1995 |

* cited by examiner

LOGICAL STRUCTURE OF RECORD INFORMATION
(LOGICAL FORMAT)

STRUCTURE OF INTERLEAVED UNIT

IU : INTERLEAVED UNIT

FIG. 4

1st OPERATION PROHIBIT INFORMATION

| | | 201 |
|---|---|---|
| 202a | 1st SEARCH PROHIBIT FLAG | ON |
| 202b | 1st SCAN PROHIBIT FLAG | OFF |
| 202c | 1st SLOW PROHIBIT FLAG | OFF |
| 202d | 1st REVERSE PROHIBIT FLAG | ON |
| 202e | 1st PAUSE PROHIBIT FLAG | ON |
| | ⋮ | ⋮ |

202 = {202a, 202b, 202c, 202d, 202e}

DATA STRUCTURE OF PCI

| CONTENT | NUMBER OF BYTES |
|---|---|
| GENERAL INFORMATION | 56BYTES |
| ANGLE INFORMATION | 36BYTES |
| HIGHLIGHT INFORMATION | 688BYTES |
| 2nd OPERATION PROHIBIT INFORMATION | 1BYTE |
| RESERVED AREA FOR SYSTEM EXPANSION | 198BYTES |

211 points to the 2nd OPERATION PROHIBIT INFORMATION row.

2nd OPERATION PROHIBIT INFORMATION

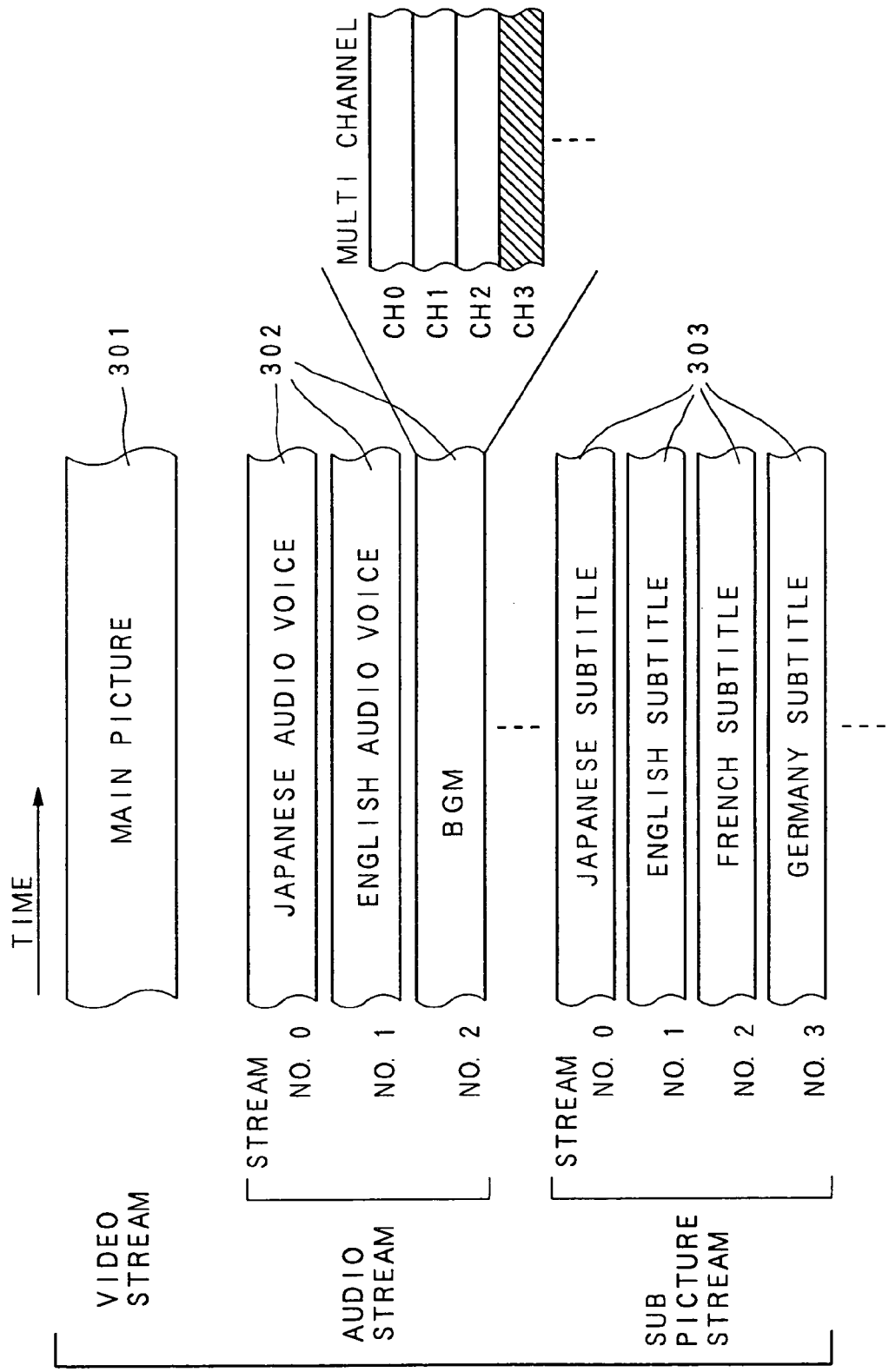

FIG. 9

STREAM SELECTION PROHIBIT INFORMATION (IN PGCI) 401

| | | |
|---|---|---|
| 402a | AUDIO STREAM #1 PROHIBIT FLAG | ON |
| 402b | AUDIO STREAM #2 PROHIBIT FLAG | OFF |
| | ⋮ | ⋮ |
| | AUDIO STREAM #8 PROHIBIT FLAG | OFF |
| 403a | SUB PICTURE STREAM #1 PROHIBIT FLAG | ON |
| 403b | SUB PICTURE STREAM #2 PROHIBIT FLAG | OFF |
| | ⋮ | ⋮ |
| | SUB PICTURE STREAM #8 PROHIBIT FLAG | OFF |

1st SELECTION PROHIBIT INFORMATION (audio streams #1–#8)

2nd SELECTION PROHIBIT INFORMATION (sub picture streams #1–#8)

INFORMATION RECORD MEDIUM, APPARATUS FOR RECORDING THE SAME AND APPARATUS FOR REPRODUCING THE SAME

This is a continuation of application Ser. No. 09/731,653, filed on Dec. 8, 2000, now U.S. Pat. No. 7,035,529 which is a continuation of prior application Ser. No. 08/834,806, filed on Apr. 3, 1997, now U.S. Pat. No. 6,215,952, issued on Apr. 10, 2001. These prior applications are incorporated by reference herein in their entireties.

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, for example, such an interactive reproduction as in a recent game or educational software cannot be performed in which, after a "question" is displayed, different displays, audio outputs and the like are selectively performed depending upon the content of "answer" inputted by the audience (e.g., if the "answer" is correct, the video image display or the audio sound output corresponding to the correct answer is performed, while, if the "answer" is incorrect, the video image display or the audio sound output corresponding to the incorrect answer is performed).

On the other hand, a proposal and a development are being made as for an interactive reproduction of the DVD, as an optical disk in which the memory capacity is improved by about ten times without changing the size of the optical disk itself as compared with the aforementioned conventional CD.

It will be possible to make a DVD player perform a special operation, such as a search (retrieving), a scan (speedy watching and checking), a reverse (reverse direction viewing), a slow reproduction, a pause (temporarily stopping) and so on, in the same manner as a conventional LD player, from its constitutional property. Namely, the DVD player capable of performing the aforementioned interactive reproduction, will have dual functions i.e. both of a function of a reproducing apparatus for simply reproducing the information versus time in the same manner as the conventional LD player and a function of an apparatus for performing the interactive operation in the same manner as a personal computer or a game machine. Therefore, in case of the above mentioned DVD for education or game purpose capable of the interactive reproduction, it will be possible to reproduce the "correct answer" screen or the "prize" screen, which is supposed to be watched only after answering the question or attaining the game, before answering the question or attaining the game at the time of performing the search, the scan, the reverse and so on.

Furthermore, it will be also possible to perform the slow reproduction, the pause reproduction or the like, with respect to the reproduction of a software in which the speed is the important factor, such as the shooting game, the fighting game and so on.

On the other hand, in one movie, there may be a scenery in which an ignoble or grubby word (voice sound), which is not desired to be listen to by children, exists. Therefore, the version for adult and the version for child are separately manufactured and sold on the market, as different disks for the same movie. In the same manner, the version of English voice sound with Japanese subtitle and the version of Japanese-dubbed voice sound without any subtitle are manufactured and sold on the market as different disks for the same movie.

In the above explained manner, such reproductions that the "correct answer" screen or "prize" screen, which is supposed to be watched only after answering the question or attaining the game, is watched before answering the question or attaining the game at the time of performing the search, the scan, the reverse and so on, the shooting game or the like is played by the slow reproduction or stopped by the pause, are basically contradict to the intention are basically contrary to the intention of an author (i.e. a producer of the software) and are further undesirable for the audience (i.e. the user of the software) on the progress of the game or study.

However, there is no proposal or development made as for a DVD technique to prohibit such a reproduction at the time of the special operation such as the search, the scan, the slow etc., which is not intended by the author or not desired by the audience. Further, in the technical art of the interactive reproduction of the DVD which has the aforementioned dual functions, the actuality is such that a person having an ordinary skill in this art does not even recognize the problem or subject itself that the reproduction, which is not intended by the author or not desired by the audience, upon performing the special reproduction such as the search, the scan, the slow etc. should not be performed.

On the other hand, manufacturing and selling the adult version and the child version as different disks as aforementioned will cause an increase of the cost and a degradation of the convenience of the disk. Further, in case that those two versions are simply recorded on one disk, the required memory capacity will be roughly doubled as compared with the case of recording just one version thereon, resulting in the high cost again. Furthermore, from the worldwide view point, the standards of vulgarity or scurrility are different from country to country. However, if the disks having the contents different from country to country are produced, the benefit of mass-production is vanished, and that the production control becomes very difficult. Namely, such an administratively undesirable condition happens that only one version of the plurality of versions is sold out while others are left in the basket. In this manner, the technique to efficiently reproduce the adult version and the child version from one disk, or efficiently reproduce the English voice sound version and the Japanese dubbed version from one disk, are not yet proposed or developed.

SUMMARY OF THE INVENTION

It is therefore an object of the present invention to provide an information record medium, an apparatus for recording the same, and an apparatus for reproducing the same, which allows the author of the information record medium to give a desirable restriction to the special reproductions such as the search operation, the scan operation and the like of the reproducing apparatus capable of performing the interactive reproduction.

The above object of the present invention can be achieved by a first information record medium having a record track recorded with at least video information to be reproduced by a reproducing apparatus. The reproducing apparatus is provided with a read device, and reproduces at least video information while relatively moving the read device along the record track. In the first information record medium, at least video information and control information comprising access information to access the video information are recorded on the record track such that the video and control informations are divided into a plurality of first data groups, each of which is a unit able to be accessed by the reproducing apparatus and each of which comprises the video and control informations. In the first information record medium, management information including (i) reproduction procedure information prescribing a reproduction procedure of the video information and (ii) a plurality of first search prohibit informations each indicating a prohibition of a search operation by the reproducing apparatus for respective one of second data groups each of which comprises a plurality of the first data groups to be reproduced continuously by the reproducing apparatus in accordance with the reproduction procedure information, is collectively recorded at one portion of the record track for each of the second data groups.

According to the first information record medium, at least video information and control information are recorded on the record track such that the video and control informations are divided into a plurality of first data groups. Then, the management information is collectively recorded at one portion of the record track for each of the second data groups. The management information includes (i) the reproduction procedure information prescribing a reproduction procedure of the video information and (ii) the first search prohibit informations each indicating the prohibition of the search operation by the reproducing apparatus for respective one of second data groups each of which comprises a plurality of the first data groups to be reproduced continuously in accordance with the reproduction procedure information. Thus, later on, by reproducing these management information and control information in advance of reproducing the substantial video information in the reproducing apparatus, even if the audience tries to operate the reproducing apparatus to execute the search operation which the author intends to prohibit, the execution of this search operation can be promptly and certainly prevented on the basis of the first search prohibit information collectively recorded in the management information for each of the second data group.

In one aspect of the first information record medium of the present invention, the control information in each of the first data groups respectively includes a second search prohibit information, which indicates a prohibition of the search operation of respective one of the second data groups including the control information by the reproducing apparatus.

According to this aspect, the control information in each first data group includes the second search prohibit information. Here, the second search prohibit information indicates the prohibition of the search operation of respective one of the second data groups. Therefore, even if it is tried to execute the search operation within the second data group where the search operation is prohibited by the first search prohibit information, due to an error of the reproducing apparatus etc., still, by firstly reproducing the control information of the first data group which is the unit able to be accessed within the pertinent second data group, it is possible to stop the search operation before reproducing the substantial information such as the video information on the basis of the second search prohibit information included in the firstly reproduced control information.

The above object of the present invention can be also achieved by a second information record medium having a record track recorded with at least video information and audio information to be reproduced by a reproducing apparatus. The reproducing apparatus is provided with a read device, and reproduces at least video and audio informations while relatively moving the read device along the record track. In the second information record medium, at least video and audio informations and control information comprising access information to access the video and audio informations are recorded on the record track such that the video, audio and control informations are divided into a plurality of first data groups, each of which is a unit able to be accessed by the reproducing apparatus and each of which comprises the video, audio and control informations. In the second information record medium, management information including (i) reproduction procedure information prescribing a reproduction procedure of the video and audio informations and (ii) a plurality of first selection prohibit informations each indicating a prohibition of selecting arbitrary at least one of a plurality of streams of the audio information which correspond to one stream of the video information and among which a desired stream is to be selected and reproduced by the reproducing apparatus, for respective one of second data groups each of which comprises a plurality of the first data groups to be reproduced continuously by the reproducing apparatus in accordance with the reproduction procedure information, is collectively recorded at one portion of the record track for each of the second data groups.

In the second information record medium, a plurality of streams or arrangements of audio information respectively corresponding to, for example, English voice sound, Japanese voice sound (i.e. dubbed voice sound into Japanese), BGM (Back Ground Music) and so on, are recorded. Here, by prohibit the selection of arbitrary one or more than one of these streams by use of the first selection prohibit information, later on, the selection of the arbitrary one or more than one of these streams can be prohibited by the reproducing apparatus according to the author's intention.

The above object of the present invention can be also achieved by a third information record medium having a record track recorded with at least video information and sub picture information to be reproduced by a reproducing apparatus. The reproducing apparatus is provided with a read device, and reproduces at least video and sub picture informations while relatively moving the read device along the record track. In the third information record medium, at least video and sub picture informations and control information comprising access information to access the video and sub picture informations are recorded on the record track such that the video, sub picture and control informations are divided into a plurality of first data groups, each of which is a unit able to be accessed by the reproducing apparatus and each of which comprises the video, sub picture and control informations. In the third information record medium, management information including (i) reproduction procedure information prescribing a reproduction procedure of the video and sub picture informations and (ii) a plurality of first selection prohibit informations each indicating a prohibition of selecting arbitrary at least one of a plurality of streams of the sub picture information which correspond to one stream of the video information and among which a desired stream is to be selected and reproduced by the reproducing apparatus, for respective one of second data groups each of which comprises a plurality of the first data groups to be reproduced continuously by the reproducing apparatus in accordance with the reproduction procedure information, is collectively recorded at one portion of the record track for each of the second data groups.

In the third information record medium, a plurality of streams or arrangements of sub picture information respectively corresponding to, for example, Japanese subtitle, English subtitle and so on, are recorded. Here, by prohibit the selection of arbitrary one or more than one of these streams by use of the second selection prohibit information, later on, the selection of the arbitrary one or more than one of these streams can be prohibited by the reproducing apparatus according to the author's intention.

The above object of the present invention can be also achieved by a first information recording apparatus for recording an information record medium having a record track recorded with at least video information to be reproduced by a reproducing apparatus. The reproducing apparatus is provided with a read device, and reproduces at least video information while relatively moving the read device along the record track. The first information recording apparatus is provided with: an access information generation device for generating access information to access the video information in association with the video information; a record device for recording at least video information and control information comprising the generated access information onto the record track such that the video and control informations are divided into a plurality of first data groups, each of which is a unit able to be accessed by the reproducing apparatus and each of which comprises the video and control informations, and for further recording management information including (i) reproduction procedure information prescribing a reproduction procedure of the video information and (ii) a plurality of first search prohibit informations each indicating a prohibition of a search operation by the reproducing apparatus for respective one of second data groups each of which comprises a plurality of the first data groups to be reproduced continuously by the reproducing apparatus in accordance with the reproduction procedure information, collectively at one portion of the record track for each of the second data groups; and an input device for inputting the first search prohibit informations.

According to the first information recording apparatus, the access information corresponding to the video information is generated by the access information generation device. Then, at least the video information and the control information are recorded onto the record track, such that the video and control informations are divided into a plurality of first data groups, by the record device. At this time, when the first search prohibit information is inputted by the input device, the management information including this inputted first search prohibit information is recorded collectively at one portion of the record track for each of the second data groups, by the record device. Therefore, the above described first information record medium of the present invention can be recorded and obtained.

In one aspect of the first information recording apparatus of the present invention, the record device records the control information such that the control information in each of the first data groups respectively includes a second search prohibit information, which indicates a prohibition of the search operation of respective one of the second data groups including the control information by the reproducing apparatus. And that, the input device is constructed to further input the second search prohibit information.

According to this aspect, when the second search prohibit information is inputted by the input device, the control information including this inputted second search prohibit information is recorded onto the record track for each of the first data groups one after another. Therefore, the above described first information record medium in one aspect of the present invention can be recorded and obtained.

The above object of the present invention can be also achieved by a second information recording apparatus for recording an information record medium having a record track recorded with at least video information and audio information to be reproduced by a reproducing apparatus. The reproducing apparatus is provided with a read device, and reproduces at least video and audio informations while relatively moving the read device along the record track. The second information recording apparatus is provided with: an access information generation device for generating access information to access the video and audio informations in association with the video and audio informations; a record device for recording at least video and audio informations and control information comprising the generated access information onto the record track such that the video, audio and control informations are divided into a plurality of first data groups, each of which is a unit able to be accessed by the reproducing apparatus and each of which comprises the video, audio and control informations, and for further recording management information including (i) reproduction procedure information prescribing a reproduction procedure of the video and audio informations and (ii) a plurality of first selection prohibit informations each indicating a prohibition of selecting arbitrary at least one of a plurality of streams of the audio information which correspond to one stream of the video information and among which a desired stream is to be selected and reproduced by the reproducing apparatus, for respective one of second data groups each of which comprises a plurality of the first data groups to be reproduced continuously by the reproducing apparatus in accordance with the reproduction procedure information, collectively at one portion of the record track for each of the second data groups; and an input device for inputting the first selection prohibit informations.

According to the second information recording apparatus, the access information corresponding to the video information and the audio information is generated by the access information generation device. Then, at least the video information, the audio information and the control information are recorded onto the record track, such that the video, audio and control informations are divided into a plurality of first data groups, by the record device. At this time, when the first selection prohibit information is inputted by the input device, the management information including this inputted first selection prohibit information is recorded collectively at one portion of the record track for each of the second data groups, by the record device. Therefore, the above described second information record medium of the present invention can be recorded and obtained.

The above object of the present invention can be also achieved by a third information recording apparatus for recording an information record medium having a record track recorded with at least video information and sub picture information to be reproduced by a reproducing apparatus. The reproducing apparatus is provided with a read device, and reproduces at least video and sub picture informations while relatively moving the read device along the record track. The third information recording apparatus is provided with: an access information generation device for generating access information to access the video and sub picture informations in association with the video and sub picture informations; a record device for recording at least video and sub picture informations and control information comprising the generated access information onto the record track such that the video, sub picture and control informations are divided into a plurality of first data groups, each of which is a unit able to be accessed by the reproducing apparatus and each of which comprises the video, sub picture and control informations, and for further recording management information including (i) reproduction procedure information prescribing a reproduction procedure of the video and sub picture informations and (ii) a plurality of second selection prohibit informations each indicating a prohibition of selecting arbitrary at least one of a plurality of streams of the sub picture information which correspond to one stream of the video information and among which a desired stream is to be selected and reproduced by the reproducing apparatus, for respective one of second data groups each of which comprises a plurality of the first data groups to be reproduced continuously by the reproducing apparatus in accordance with the reproduction procedure information, collectively at one portion of the record track for each of the second data groups; and an input device for inputting the second selection prohibit informations.

According to the third information recording apparatus, the access information corresponding to the video information and the sub picture information is generated by the access information generation device. Then, at least the video information, the sub picture information and the control information are recorded onto the record track, such that the video, sub picture and control informations are divided into a plurality of first data groups, by the record device. At this time, when the second selection prohibit information is inputted by the input device, the management information including this inputted second selection prohibit information is recorded collectively at one portion of the record track for each of the second data groups, by the record device. Therefore, the above described third information record medium of the present invention can be recorded and obtained.

The above object of the present invention can be also achieved by a first information reproducing apparatus for reproducing the above described first information record medium of the present invention. The first information reproducing apparatus is provided with: a read device for reading information recorded at a predetermined read position on the record track; a reproduction device for reproducing the information read by the read device; a specification device for specifying an execution of the search operation with respect to the information reproducing apparatus; and a control device for controlling at least one of the read device, the reproduction device and the specification device to execute the specified search operation in case that the execution of the search operation is specified by the specification device, and for further controlling at least one of the read device, the reproduction device and the specification device to reproduce the management information in advance of executing the specified search operation and not to execute the specified search operation in one second data group which prohibition of the search operation is indicated by corresponding one of the first search prohibit informations included in the reproduced management information.

According to the first information reproducing apparatus of the present invention, the information recorded at a predetermined read position on the record track is read by the read device, and the information read by the read device is reproduced by the reproduction device. Therefore, by reproducing the management information in advance of reproducing the substantial video information, even if the audience tries to operate the reproducing apparatus through the specification device to execute the search operation which the author intends to prohibit, the execution of this search operation can be promptly and certainly prevented on the basis of the first search prohibit information collectively recorded in the management information for each of the second data group.

In one aspect of the first information reproducing apparatus of the present invention, the control information in each of the first data groups respectively includes a second search prohibit information, which indicates a prohibition of the search operation of respective one of the second data groups including the control information. And that, the control device controls at least one of the read device, the reproduction device and the specification device to reproduce the control information in advance of reproducing the video information in each of the first data groups and not to execute the specified search operation in one second data group which prohibition of the search operation is indicated by corresponding one of the second search prohibit informations included in the reproduced control information.

According to this aspect, even if it is tried by the read device to execute the search operation within the second data group where the search operation is prohibited by the first search prohibit information, due to an error of the reproducing apparatus etc., still, by firstly reproducing the control information of the first data group which is the unit able to be accessed within the pertinent second data group, it is possible to stop the search operation before reproducing the substantial information such as the video information on the basis of the second search prohibit information included in the firstly reproduced control information.

The above object of the present invention can be also achieved by a second information reproducing apparatus for reproducing the above described second information record medium of the present invention. The second information reproducing apparatus is provided with: a read device for reading information recorded at a predetermined read position on the record track; a reproduction device for reproducing the information read by the read device; a specification device for specifying the desired stream of the audio information with respect to the information reproducing apparatus; and a control device for controlling at least one of the read device, the reproduction device and the specification device to reproduce the specified desired stream of the audio information together with the one stream of the video information, and for further controlling at least one of the read device, the reproduction device and the specification device to reproduce the management information in advance of selecting or reproducing the specified desired stream of the audio information and not to select or reproduce one stream of the audio information which selection is prohibited by corresponding one of the first selection prohibit informations included in the reproduced management information.

According to the second information reproducing apparatus of the present invention, at the time of reproducing the second information record medium, as for one or more than one of the streams of the audio information prohibited by the author's intention, the selection or reproduction thereof can be prevented on the basis of the first selection prohibit information.

The above object of the present invention can be also achieved by a third information reproducing apparatus for reproducing the above described third information record medium of the present invention. The third information reproducing apparatus is provided with: a read device for reading information recorded at a predetermined read position on the record track; a reproduction device for reproducing the information read by the read device; a specification device for specifying the desired stream of the sub picture information with respect to the information reproducing apparatus; and a control device for controlling at least one of the read device, the reproduction device and the specification device to reproduce the specified desired stream of the sub picture information together with the one stream of the video information, and for further controlling at least one of the read device, the reproduction device and the specification device to reproduce the management information in advance of selecting or reproducing the specified desired stream of the sub picture information and not to select or reproduce one stream of the sub picture information which selection is prohibited by corresponding one of the second selection prohibit informations included in the reproduced management information.

According to the third information reproducing apparatus of the present invention, at the time of reproducing the third information record medium, as for one or more than one of the streams of the sub picture information prohibited by the author's intention, the selection or reproduction thereof can be prevented on the basis of the second selection prohibit information.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1A is a perspective view of the DVD in FIG. 1;

FIG. 4 is a table showing first operation prohibit information constructed in the DVD in FIG. 1;

FIG. 8 is a diagram showing a logical structure of streams in the embodiment;

FIG. 9 is a table showing stream selection prohibit information constructed in the DVD in FIG. 1;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

| | |
|---|---|
| first data group | VOBU (VOB (Video OBject)-Unit) |
| second data group | PGC (Program Chain) |
| management information | PGCI (ProGram Chain Information) |
| control information | PCI (Presentation Control Information) |
| reproduction procedure information | reproduction procedure information (in PGCI) |
| first search prohibit information | first search prohibit flag (in PGCI) |
| first selection prohibit information | first selection prohibit flag (in PGCI) |
| second selection prohibit information | second selection prohibit flag (in PGCI) |
| second search prohibit information | second search prohibit flag (in PCI of each VOBU) |

(I) Embodiment of Information Record Medium

First of all, a physical structure and a logical structure as well as an operation of a DVD, as one embodiment of the information record medium to which the present invention is applied, will be explained with reference to FIGS. 1 to 3.

Figure 1:
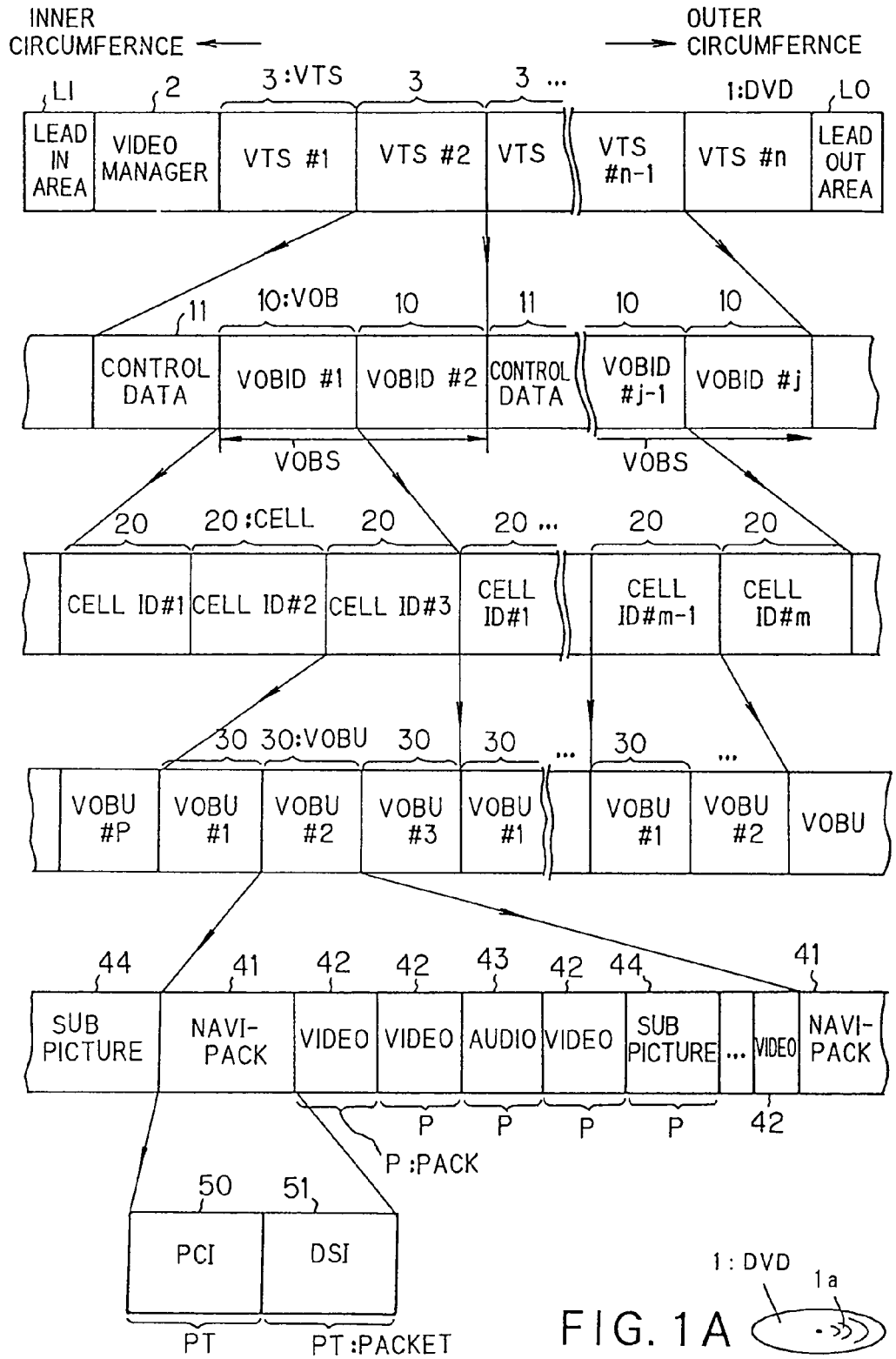
FIG. 1 is a diagram showing a physical structure of record information of a DVD as one embodiment of the present invention.

At first, a record format of video information and audio information on a record track of the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded along the record track such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

These video, audio and control informations are recorded on a spiral or coaxial record track 1a of the DVD 1 as shown in FIG. 1A.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for the control information; a video pack 42 for the video information; an audio pack 43 for the audio information; and a sub picture pack 44 for the sub picture information. Here, in the video pack 42, a packet including the video data is recorded. In the audio pack 43, a packet including the audio data is recorded. Further, in the sub picture pack 44, a packet including graphics such as a character and a diagram as the sub picture, is recorded. In the video packs 42, which data amount is relatively large as shown in FIG. 1, one or a plurality of GOPs are recorded within one VOB unit 30. The audio pack 43 and the sub picture pack 44 are disposed intermittently between the video packs 42. It is prescribed by a standard specification of the DVD that there are 8 kinds of audio recordable on the DVD 1 while 32 kinds of sub picture recordable on the DVD 1. Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture. The MPEG 2 method used in the DVD 1 of the present embodiment employs a variable rate method, in which the data amount included in each GOP is not constant.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 2. The information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the control data 11.

Figure 2:
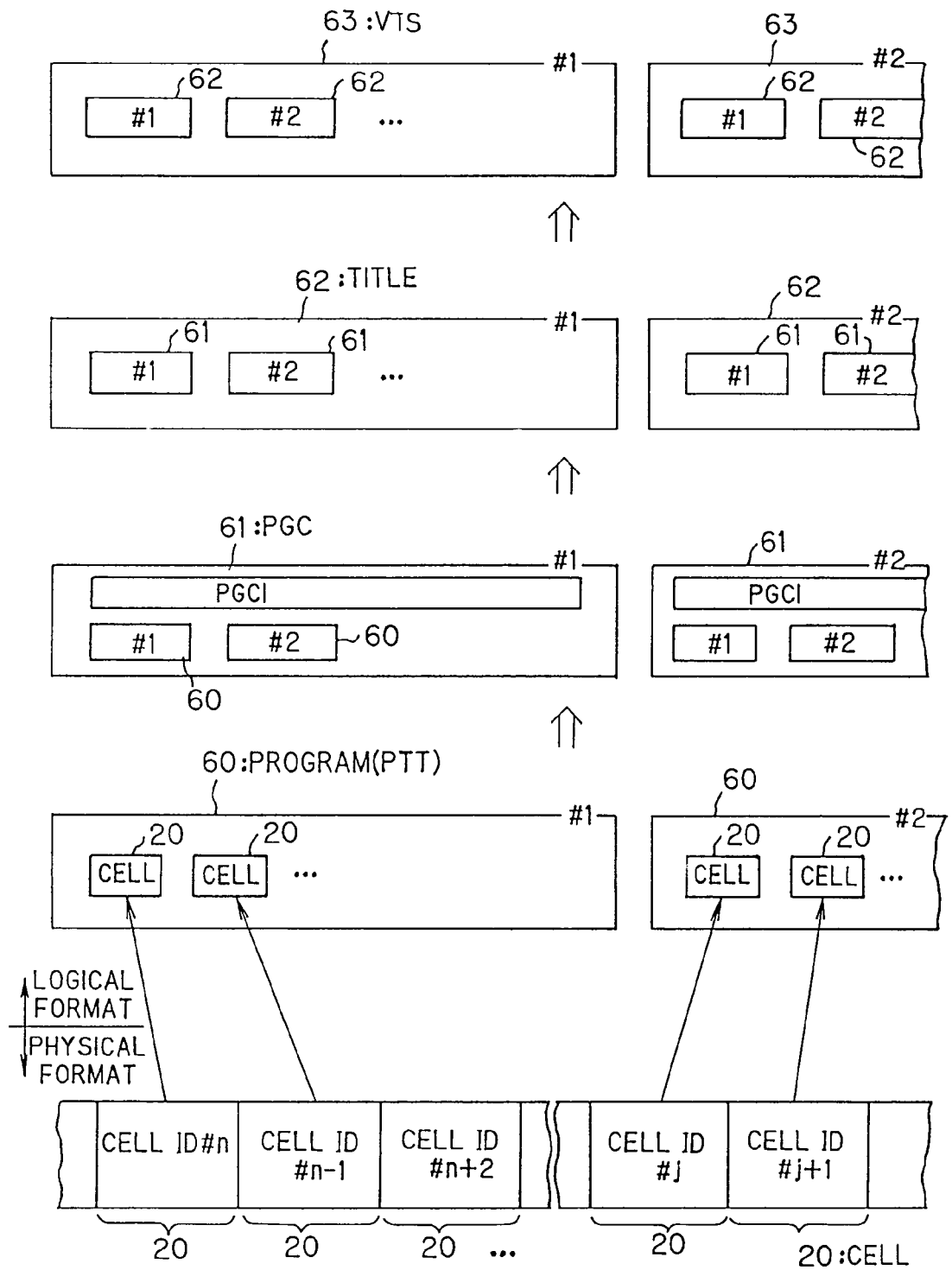
FIG. 2 is a diagram showing a logical structure of the record information of the DVD in FIG. 1.

To make the explanation clear, the following explanation is made from the lower hierarchical layer in FIG. 2. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 2. The title 62 included in the VTS 63 has the attributes common to each other. For example, the movies based on one movie but in different languages correspond to the respective titles 62. The information included in one VTS 63 shown in FIG. 2 corresponds to information included in one VTS 3 shown in FIG. 1. Namely, all information included in the logical VTS 63 shown in FIG. 2 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 3.

Figure 3:
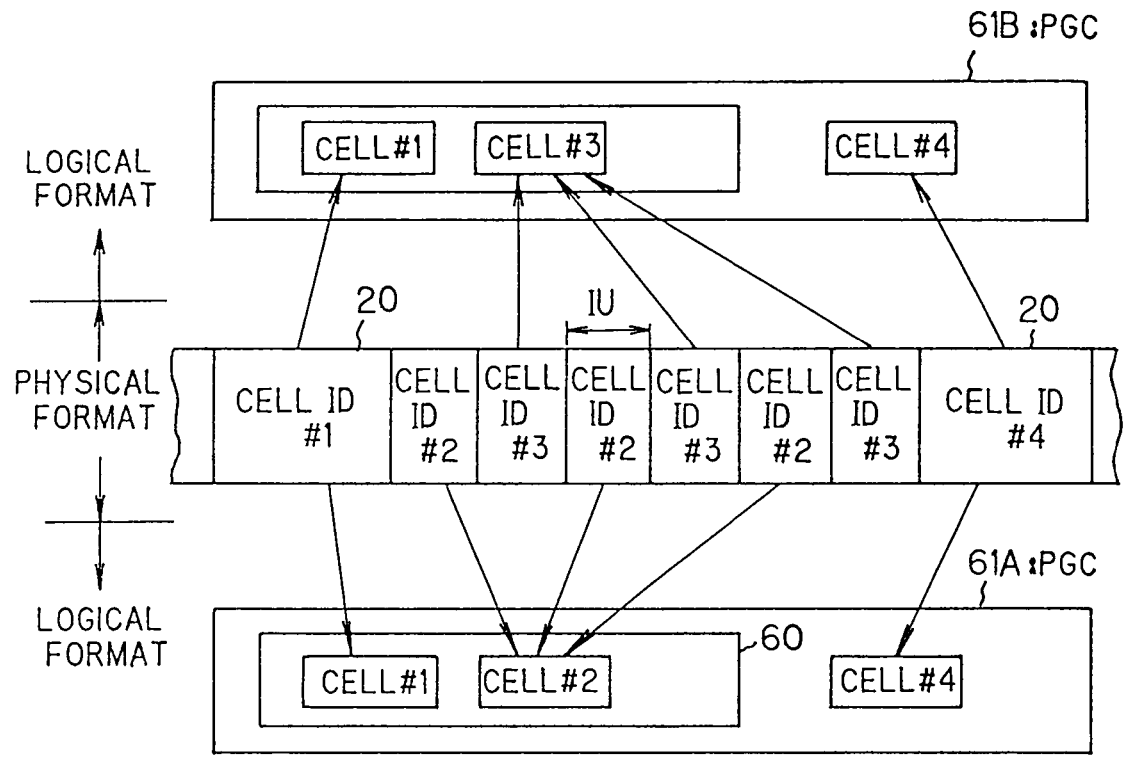
FIG. 3 is a diagram showing a structure of an interleaved unit of the DVD in FIG. 1.

Namely, as shown in FIG. 3, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 3, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Nextly, among the various control information having the above described physical and logical structures, a first search prohibit flag, which constructs one example of a first search prohibit information of the present invention, and a second search prohibit flag, which constructs one example of a second search prohibit information of the present invention will be explained in detail.

Figure 5:
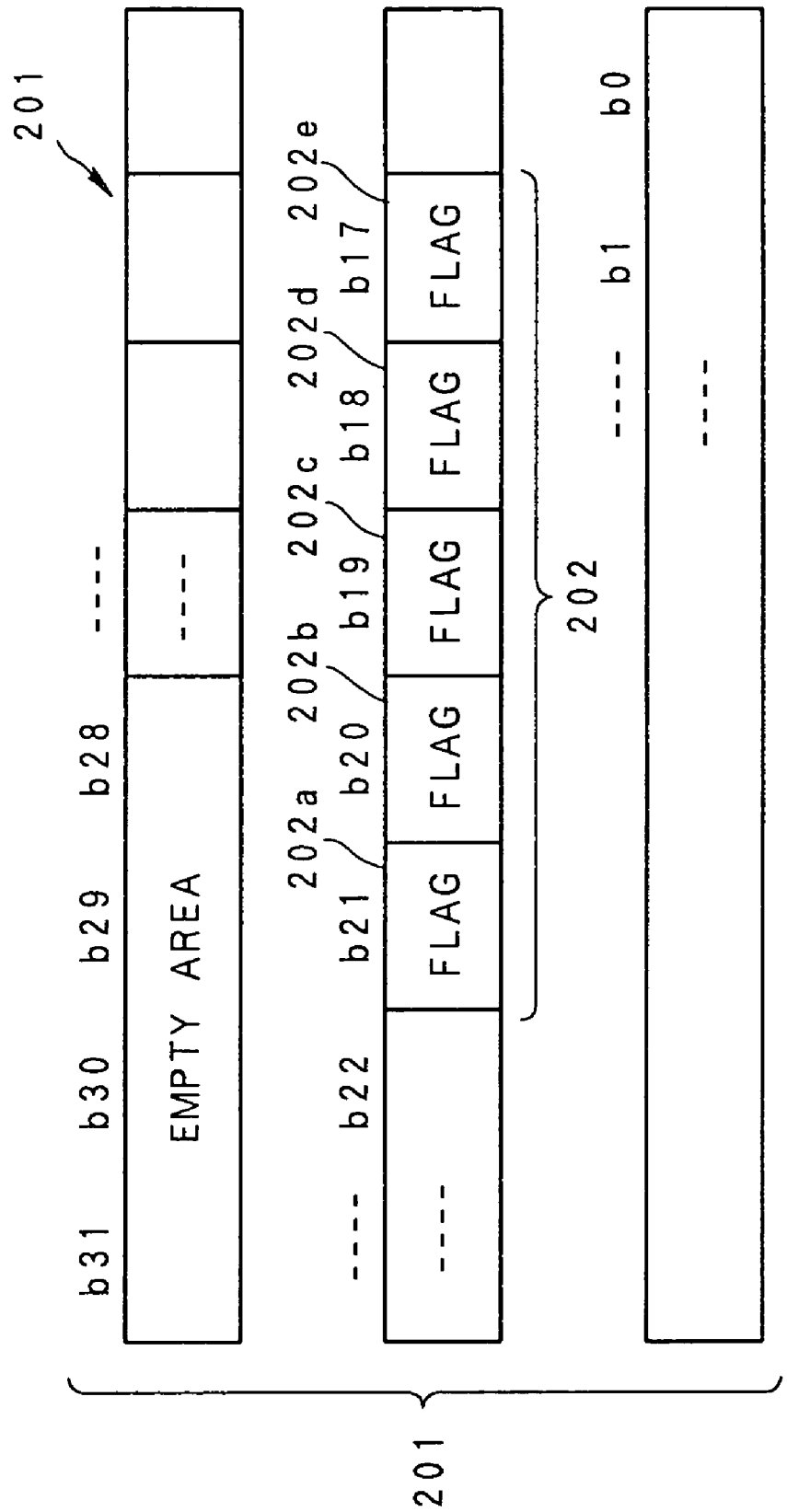
FIG. 5 is a diagram showing the data structure of the first operation prohibit information in FIG. 4.

At first, a first operation prohibit flag including the first search prohibit flag is explained with reference to FIGS. 1, 4 and 5.

The PGCI (ProGram Chain Information) included in the control data 11, which is recorded at the head of the VTS 3 as shown in FIG. 1, is provided with: reproduction procedure information, which prescribes a reproduction procedure of the video information (i.e. main picture information), the audio information and the sub picture information by the unit of each cell; and first operation prohibit information 201, which indicates prohibition or permission of the special operation, such as the search operation etc., as for the whole of the pertinent PGC, as shown in FIG. 4.

Namely, in FIG. 4, a first operation prohibit flag (set) 202 is to prohibit the special operation of the reproducing apparatus, such as the search operation etc., in the PGC to which the pertinent PGCI belongs to. The first operation prohibit flag (set) 202 includes: a first search prohibit flag 202a to prohibit the search operation; a first scan prohibit flag 202b to prohibit the scan operation: a first slow prohibit flag 202c to prohibit the slow reproducing operation; a first reverse prohibit flag 202d to prohibit the reverse operation; and a first pause prohibit flag 202e to prohibit the pause operation etc., in this order. Here, the slow operation and the pause operation may be treated as one set of similar operations, and these operations may be collectively prohibited by one operation prohibit flag. In case that each flag constituting the first operation prohibit flag (set) 202 is "OFF" (i.e. the flag is not set), any restriction is not applied to the respective special operation on the basis of the first operation prohibit flag 202 under the control of the system controller of the reproducing apparatus described later. On the other hand, in case that each flag of the first operation prohibit flag 202 is "ON" (i.e. the flag is set), the respective special operation, such as the search, the scan, the reverse etc., corresponding to the pertinent flag of the reproducing apparatus is prohibited by the unit of the PGC, under the control of the system controller. Namely, by the control of the system controller, the slow reproduction in the shooting game or the like is prohibited, or the search operation to the prize screen before the achievement of the game or the like is prohibited.

In the example of FIG. 4, although the first operation prohibit information 201 is indicated as a table, the first operation prohibit information 201 may be constructed by binary data of 32 bits in each PGCI, as a concrete example. Namely, as shown in FIG. 5, the first operation prohibit information 201 is constructed by 32 bits b0 to b31, wherein the bits b21 to b17 among them are assigned to the prohibit flags 202a to 202e respectively. Here, each prohibit flag 202a to 202e is set to OFF in case of "0" and is set to ON in case of "1".

Nextly, a second operation prohibit flag including a second search prohibit flag is explained with reference to FIGS. 1, 6 and 7.

The PCI (Presentation Control Information) packet 50 included in the navi-pack 41 shown in FIG. 1 includes the navigation information having the unique content for each VOBU 30 to perform the display control at the time of displaying the video image or outputting the audio sound, which are searched on the basis of the DSI (Data Search Information) packet 51 included also in the navi-pack 41, and is constructed to have the second operation prohibit flag.

More concretely, for example, the data structure of the PCI packet 51 is constructed by: PCI general information which is general information to perform the display control with respect to the VOBU; angle information to perform the display control at the time of the angle reproduction; highlight information to perform the highlight display; and second operation prohibit information 211 of 1 byte including the second operation prohibit flag.

Figures 6, 7:
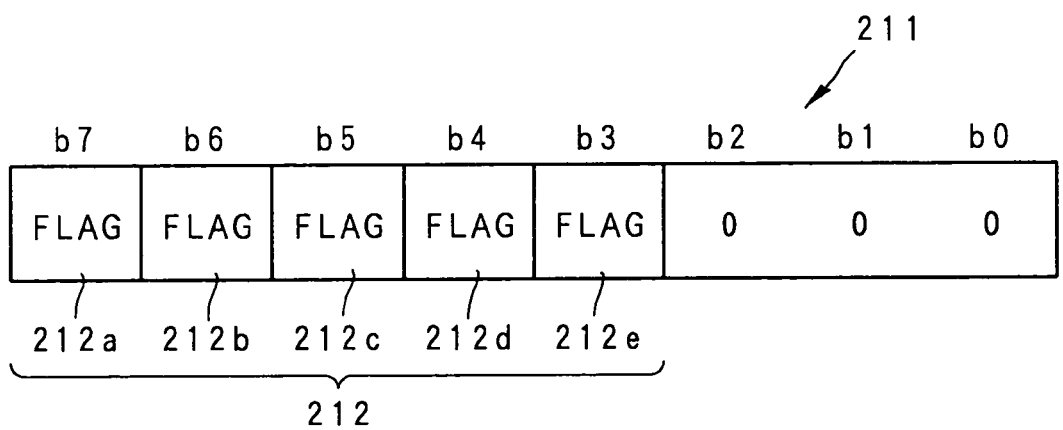
FIG. 6 is a diagram showing a data structure of a PCI constructed in the DVD in FIG. 1.
FIG. 7 is a diagram showing a data structure of second operation prohibit information in the PCI in FIG. 6.

As shown in FIG. 7, the second operation prohibit information 211 is constructed by binary data of 1 byte of the 8 bits b0 to b7 including: a second search prohibit flag 212a; a second scan prohibit flag 212b; a second slow prohibit flag 212c; a second reverse prohibit flag 212d; and a second pause prohibit flag 212e. Among these bits, 5 bits b7 to b3 are assigned to the respective flags, while 3 bit b0 to b2 are assigned to a reserved area (in a condition where "0" is arranged). In case that each of the flags 212a to 212e is "0" (i.e., the flag is not set), an operation restriction is not especially applied to the operation under the control of the system controller of the reproducing apparatus described later. In case that each of the flags is "1" (i.e., the flag is set), the special operation is prohibited as for the whole of the PGC including the pertinent VOBU under the control of the system controller.

As explained above, in the present embodiment, the prohibition of the special operation in each PGC is indicated by the first operation prohibit flag and the second operation prohibit flag. In case of the PGC for performing the aforementioned "alternative usage of the cell", there happens such a case where the second operation prohibit flag is partially "ON" or partially "OFF" within one PGC. However, since the first operation prohibit flag predominates as explained later in detail, there is raised no problem about it. Namely, in case that even one second operation flag is "ON", the first operation prohibit flag is set to "ON". In this manner, at the time of the aforementioned alternative usage of the same cell, the special operation with respect to one cell can be prohibited in one PGC while the special operation with respect to the same one cell is not prohibited in another PGC, so that variations can be constructed by use of the same cell, which is advantageous in saving the recording capacity of the DVD 1.

As described above in detail, according to the present embodiment, a plurality of first operation prohibit flags 202, which permit or prohibit the special reproduction, such as the search operation etc. of the information reproducing apparatus by the unit of PGC, are constructed within each PGCI, while the second operation prohibit flag 212, which permits or prohibits the special reproduction of the information reproducing apparatus also by the unit of PGC, is constructed within each PCI data respectively. Therefore, by referring to the first operation prohibit flag 202 constructed in the PGCI at the time of starting the reproduction of each PGCI, the fact that the reproduction thereof is prohibited can be recognized in advance of actually reproducing the video information or the like within the pertinent PGC on the basis of the first operation prohibit flag 202, by the information reproducing apparatus described later. Further, the reproducing apparatus can perform the alternative usage of the cells with various varieties by setting the contents of the first and second operation prohibit flags different from each other. Furthermore, the reproducing apparatus can more reliably prevent the reproduction of the PGC which reproduction is prohibited, in a real time manner (i.e., immediately after reading in the PCI data) on the basis of the second operation prohibit flag, at the time of reading in the PCI data which are included in the navi-pack positioned at the head of the pertinent VOBU at first, even if it becomes unknown in which PGC the optical pickup is located or the optical-pickup jumps into the PGC which reproduction is prohibited due to a transient error, an abnormality of the first operation prohibit flag. The action and effect of the present embodiment will be more clear from the explanation for the operation of the reproducing apparatus for reproducing the DVD of the present embodiment explained later.

Nextly, the constructions of the first and second selection prohibit flags related to the prohibition of selecting a certain stream of the reproduced information are explained in more detail. Here, the "stream" is defined as a logical stream or flow of the reproduced information which is prescribed by the PGCI. As a kind of stream, there are a video stream indicating a logical arrangement of the main picture information (video information), an audio stream indicating a logical arrangement of the audio information, and a sub picture stream indicating a logical arrangement of the sub picture information. One video stream and a plurality of audio streams and a plurality of sub picture streams corresponding to the one video stream are basically included in one VTS.

As shown in FIG. 8, the main picture information (video information) in one PGC is recorded as one video stream 301 which reproduction order is prescribed by the PGCI, in one title (e.g. one movie film). In correspondence with this one video stream 301, the audio sounds, which can be recorded by 8 different kinds at the maximum as aforementioned, are recorded, for example, as 8 audio streams 302 such as the Japanese audio sound, the English audio sound, the BGM and so on. Incidentally, the audio information in one audio stream 302 is respectively divided into multi-channels such as a stereo channels or the like. Furthermore, in correspondence with the video stream 301 and the audio streams 302, the sub pictures, which can be recorded by 32 different kinds at the maximum as aforementioned, are recorded, for example, as 32 sub picture streams such as the Japanese subtitle, the English sub title, the French sub title and so on.

As a result, according to the present embodiment, it is possible to reproduce an arbitrary audio stream 302 and an arbitrary sub picture stream 303 in combination along with one video stream 301, by the stream selection by use of the PGCI. For example, at the time of reproducing one movie constructing one title, if the American movie is reproduced while selecting the Japanese sub title and the English audio sound, such a circumstance can be obtained where the movie is seen in an ordinary Japanese theater. Alternatively, if the American movie is reproduced while selecting the Japanese audio sound (dubbed voice) without any sub title, it is possible for even students in an elementary school to see the American movie without any linguistic difficulty. And that, even in case that the stream selection is performed in this way, since it is enough to reproduce the common main picture information (the common video information), the recording capacity can be restrained to be very little as compared with a case of recording a plurality of different versions of the movie film.

In the present embodiment, there are especially provided the first and second selection prohibit flags in each PGCI by the unit of PGC in the stream selection shown in FIG. 8.

Figure 10A:
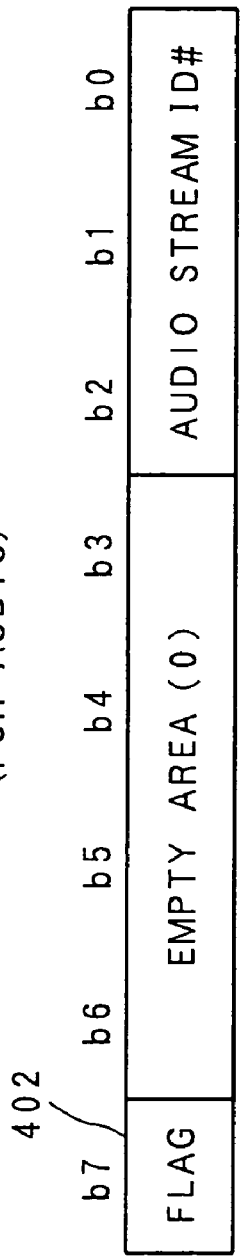
FIG. 10 is a diagram showing data structures of the first and second selection prohibit informations in the stream selection prohibit information in FIG. 9.
Figure 10B:
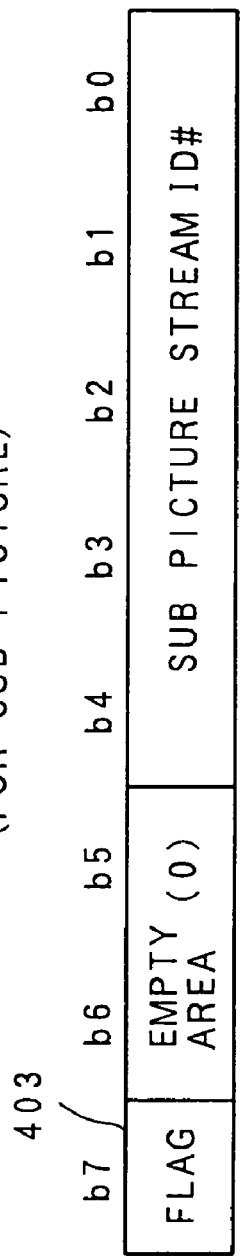

As shown in FIG. 9, stream selection prohibit information 401 in the PGCI is provided with: first selection prohibit information related to the audio stream; and second selection prohibit information related to the sub picture stream. In the former, first selection prohibit flags 402a, 402b, . . . are constructed with respect to the respective audio streams (8 kinds at the maximum). In the latter, second selection prohibit flags 403a, 403b, . . . are constructed with respect to the respective sub picture streams (32 kinds at the maximum). Namely, as shown in FIGS. 10A and 10B, each first selection prohibit information is constructed by binary data of 8 bits b0 to b7 as for each of the audio streams, wherein one bit b7 among them is assigned to the first selection prohibit flag 402 (FIG. 10A). On the other hand, each second selection prohibit information is constructed by binary data of 8 bits b0 to b7 as for each of the sub picture streams, wherein one bit b7 among them is assigned to the second selection prohibit flag 403.

At the time of recording the DVD as constructed above, the first and second operation prohibit flags are set to ON in correspondence with the operation desired to be prohibited in each PGC, and the first or second selection prohibit flags is further set to ON in correspondence with one or plurality of streams desired to be prohibited by the author in the manner as described hereinbelow.

The above described DVD has such a large memory capacity that information enough for a plurality of streams in this way can be recorded on one disk. Accordingly, it is effective to apply the above described recording format especially to the DVD 1.

(II) Embodiment of Recording Apparatus

Next, an embodiment of recording apparatus for recording the above mentioned control information, video information and audio information onto the DVD 1 will be explained with reference to FIG. 11.

At first, a construction and an operation of the recording apparatus as the embodiment is explained with reference to FIG. 11.

Figure 11:
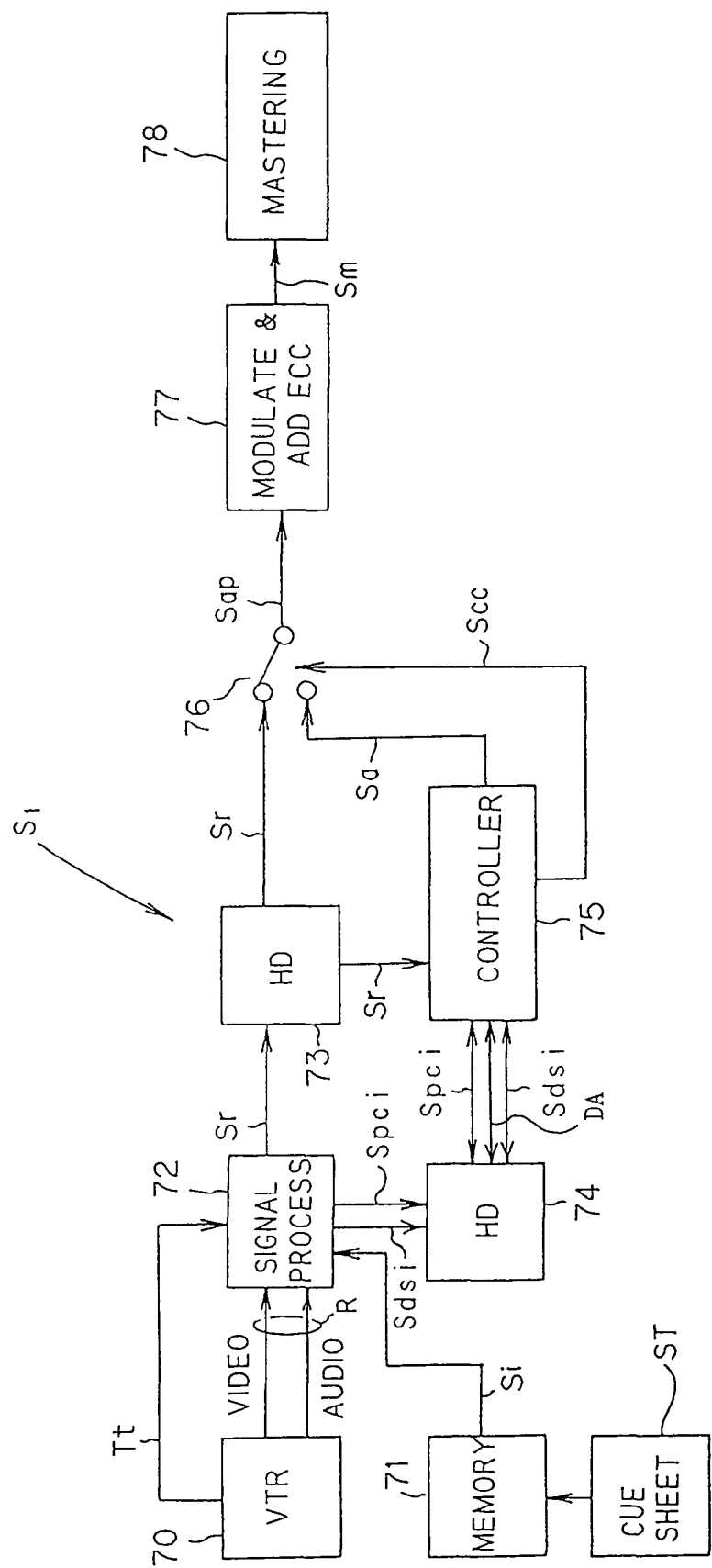
FIG. 11 is a block diagram of an information recording apparatus for recording the DVD in FIG. 1, as another embodiment of the present invention.

As shown in FIG. 11, a recording apparatus S1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which the ON/OFF of each of the first and second operation prohibit flags and the first and second selection prohibit flags etc., defined by the author are written. Then, the memory 71 outputs it as a content information signal Si on the basis of a request from the signal process unit 72.

Then, the signal process unit 72 generates and outputs PCI information signal Spci and DSI information signal Sdsi, on the basis of the time code Tt corresponding to the record information R outputted from the VTR 70 and the control information signal Si outputted from the memory 71. Then, the PCI information signal Spci and DSI information signal Sdsi are temporarily stored in the hard disk device 74.

The above described processes are performed with respect to the whole record information R.

When the above described processes are finished as for the whole record information R, the controller 75 reads out the compressed multiplexed signal Sr from the hard disk device 73, reads out the PCI information signal Spci and the DSI information signal Sdsi from the hard disk device 74, generates additional information DA on the basis of these read out signals, and temporarily stores the additional information DA into the hard disk device 74. This is because there may be control information, which content is determined in dependence upon a generation result of the compressed multiplexed signal Sr among various control informations. On the other hand, the controller 75 performs a time management for each of the operations of the signal process unit 72, the hard disk device 73 and the hard disk device 74, and reads out the additional information DA, which corresponds to the PCI information signal Spci and the DSI information signal Sdsi from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed signal Sap. If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8-16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

Nextly, the detail operation of the recording apparatus S1 for recording the first and second operation prohibit flags and the first and second selection prohibit flags onto the master disk is explained.

At first, the information selection signal Scc to select the additional information signal Sa is outputted by the controller 75 at a timing corresponding to the DSI information signal Sdsi and the PCI information signal Spci, which are inputted by the cue sheet ST and are generated on the basis of the content information SI specifying the ON/OFF of each of the first and second operation prohibit flags and the first and second selection prohibit flags for each PGC. Thus, the multiplexer 76 is switched to the side for the additional information signal Sa. Then, the first operation prohibit flag and the first and second selection prohibit flags are inputted to the modulator 77 as one portion of the additional information signal Sa, which constructs the first operation prohibit flag and the first and second operation prohibit flags respectively within the PGCI, and are further inputted to the mastering device 78 as one portion of the disk record signal Sm. Then, the PCI data, which include the second operation prohibit flag and which constitute the navi-pack 41 of the first VOBU of the first VOB shown in FIG. 1, are inputted to the modulator 77, and are inputted to the mastering device 78 as one portion of the disk record signal Sm in the same manner. Then, the information selection signal Scc to select the compressed multiplexed signal Sr is outputted by the controller 75, so that the multiplexer 76 is switched to the side for the compressed multiplexed signal Sr. Then, the video pack, the audio pack and the sub picture pack of the pertinent VOBU are inputted successively as the information added compressed multiplexed signal Sap to the modulator 77. This operation is repeatedly performed for a plurality of VOBUs, and is further repeatedly performed for a plurality of VTSs.

As a result of the above, according to the present embodiment, it is possible to produce the master disk in which: a plurality of first operation prohibit flags to respectively permit or prohibit the special reproductions for each of the operations of the information reproducing apparatus by the unit of PGC are constructed within the first operation prohibit information provided in the PGCI; the second operation prohibit flag to permit or prohibit the special reproductions for each of the operations of the information reproducing apparatus by the unit of PGC are constructed within each PCI data; and the first and second selection prohibit flags to permit or prohibit the selection of the audio and the sub picture streams respectively by the unit of PGC are constructed within the stream selection prohibit information provided in the PGCI.

(III) Embodiment of Reproducing Apparatus

Next, an embodiment of reproducing apparatus for reproducing the information recorded on the DVD 1 by the above mentioned recording apparatus will be explained with reference to FIGS. 12 to 16.

At first, a construction and an operation of the reproducing apparatus as the embodiment is explained with reference to FIG. 12.

Figure 12:
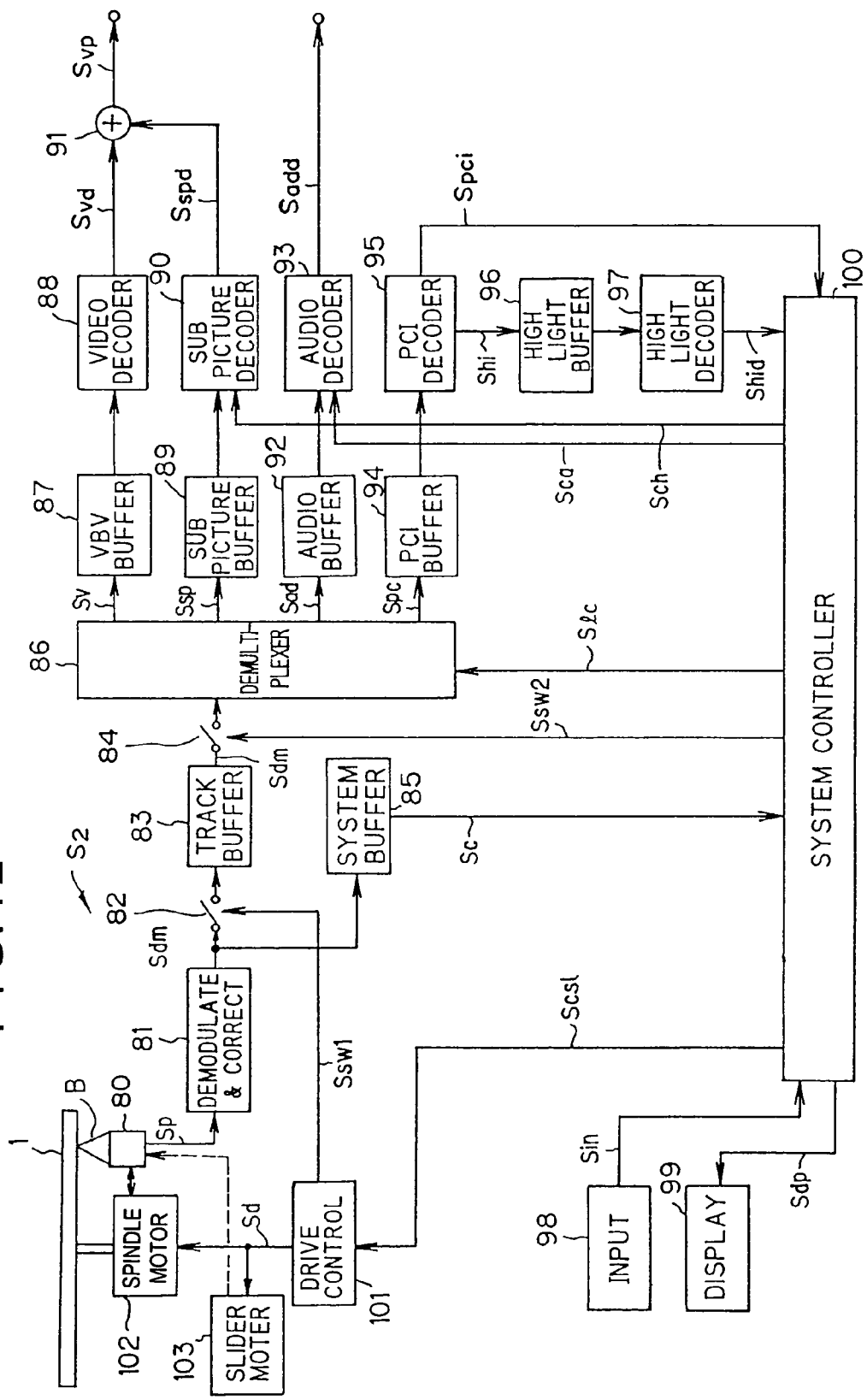
FIG. 12 is a block diagram of an information reproducing apparatus for reproducing the DVD in FIG. 1, as another embodiment of the present invention.

As shown in FIG. 12, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 12 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the language selection signal Slc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scs1 corresponding to the track jump process, to the drive controller 101, when it detects by the control signal Sc, the aforementioned DSI data etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 12), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Figure 13:
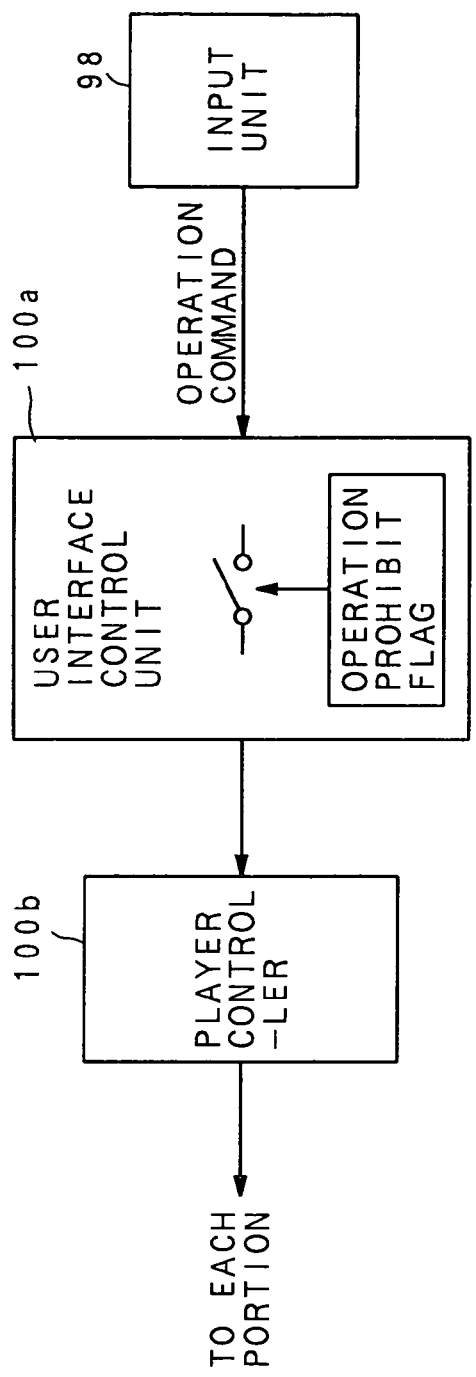
FIG. 13 is one block diagram showing a detailed construction of a system controller equipped in the information reproducing apparatus in FIG. 12.

In the present embodiment, the system controller 100 is especially provided with a user interface control unit 100a and a player controller 100b as shown in FIG. 13.

In FIG. 13, into the user interface control unit 100a, an operation command is inputted through the input unit 98 by the audience. The user interface control unit 100a has a software or hardware switch, which is opened when the audience specifies the operation command through the input unit 98 corresponding to the predetermined special operation such as the search, the scan, the slow, the reverse, the pause etc. of the reproducing apparatus S2, in case that at least one of the first and second operation prohibit flags reproduced from the DVD 1 indicates the prohibition of the pertinent special operation, so as not to transmit the operation command therethrough to the player controller 100b. On the other hand, when the prohibition is not indicated by the first or second operation prohibit flag, the switch is closed so as to transmit the operation command therethrough to the player controller 100b.

The player controller 100b controls each portion of the reproducing apparatus S2 to perform the operation corresponding to the operation command, when the operation command is inputted through this switch of the user interface control unit 100a. Therefore, the special operation which is prohibited by the first or second operation prohibit flag is not performed.

The system controller 100 may have an operation status register, which indicates the operation status of the reproducing apparatus S2, and that this operation status register may have a plurality of specific bits, each of which is set to "1" in case that the special reproduction such as the search, the scan, the slow, the reverse, the pause etc. of the reproducing apparatus S2 is being performed respectively. In this case, only when the specific bit is set to "1", it is enough to perform the prohibit control of the special operation corresponding to this set specific bit.

Further, the system controller 100 is constructed to store the first operation prohibit flag (refer to FIG. 4) described in the PGCI in advance of reproducing each PGC. Therefore, it is possible to judge whether or not the special operation of the information reproducing apparatus as for each PGC is prohibited or not, before reproducing the substantial video information etc., within the pertinent PGC. On the other hand, as for the first and second selection prohibit flags (refer to FIG. 9), it is judged whether or not the selection of each stream is prohibited at the time of starting the reproduction of each PGC.

Figure 14:
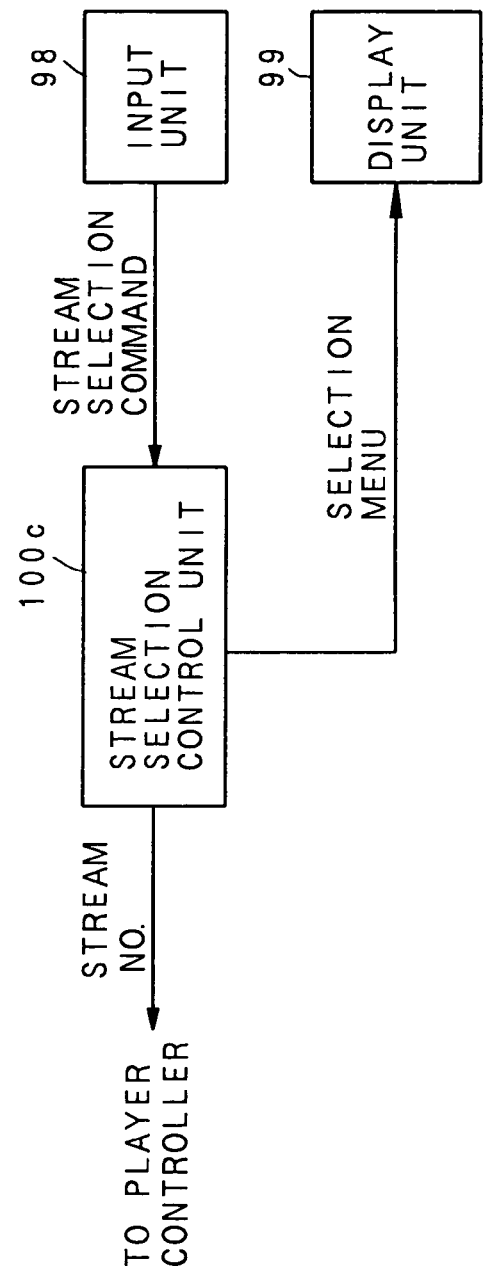
FIG. 14 is another block diagram showing a detailed construction of a system controller equipped in the information reproducing apparatus in FIG. 12.

Furthermore, in the present embodiment, the system controller 100 is provided with the stream selection control unit 100c as shown in FIG. 14.

FIG. 14, the stream selection control unit 100c is adapted to prohibit the selection, in case that the first and second selection prohibit flags reproduced from the DVD 1 prohibit the selection of some of the audio streams or the sub picture streams. Alternatively, it is adapted to control the display unit 99 not to display the selection branch or option corresponding to the prohibited selection on the selection menu. The stream selection command inputted through the input unit 98 by the audience is inputted to the stream selection control unit 100c. In this manner, if the stream which is not prohibited is selected, the stream selection control unit 100c, which has received the stream selection command from the input unit 98, transmits the stream number corresponding to this command to the player controller 100b, so that the reproduction of the selected stream is performed.

Nextly, among the operations of the reproducing apparatus S2, the prohibition of the special operation such as the search etc. and the prohibition of the stream selection, based on the first and second operation prohibit flags and the first and second selection prohibit flags respectively in the system controller 100, which are the feature of the present embodiment, are explained.

At first, the prohibition of the special operation such as the search etc. in the reproducing apparatus S2 is explained with reference to FIG. 15.

Figure 15:
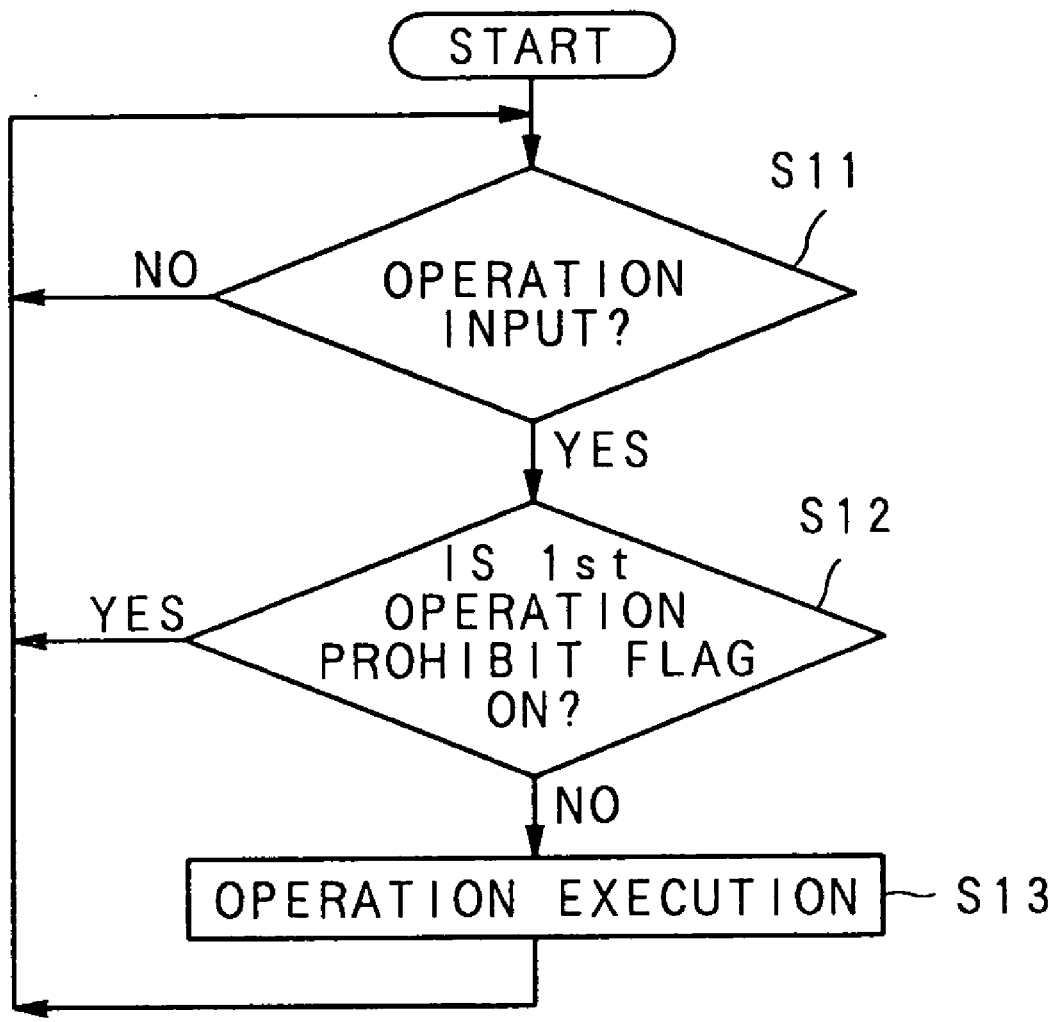
FIG. 15 is a flow chart showing an execution of a special operation of the information reproducing apparatus in FIG. 12.

In FIG. 15, in advance of inputting the operation command by the audience, the system controller 100 reads in the first operation prohibit flag as shown in FIG. 4, which is included in the PGCI data of the control data, and stores it to the memory device such as an internal RAM etc. upon starting the reproduction of each PGC, so that the first operation prohibit flag is obtained in advance. On the other hand, at the time of reproducing each of the VOBU, in advance of reproducing the substantial video, audio and sub picture information in each of the VOBU, the system controller 100 reads in the PCI data as shown in FIG. 6 recorded in the navi-pack by the unit of VOBU, so that the second operation prohibit flag is obtained in a real time manner.

In this condition, the system controller 100 waits for inputting of the operation command, which indicates the special operation such as the search, the scan, the slow etc., through the input unit 98 by the audience (step S11). Here, when there is the operation input though the input unit 98, the operation command is received (step S11: YES). Then, the system controller 100 refers to the first operation prohibit flag, so as to judge whether the first operation prohibit flag as for the special operation indicated by the operation input is "1 (ON)" or "0 (OFF)" by the unit of each PGC (step S12). If the first operation prohibit flag is "1" (step S12: YES), since the special operation which is operation-inputted for the pertinent cell is prohibited, the flow returns to the step S11 without executing this special operation, and it waits for the next operation input. At this time, it is possible that, under the control of the system controller 100, a message such as "Search for prize screen is prohibited!", "Slow reproduction is prohibited here!" or the like is displayed on the display unit 99. On the other hand, at the step S12, if the first operation prohibit flag is "0" (step S12: NO), since the special operation which is operation-inputted for the pertinent cell is not prohibited, the flow proceeds to a step S13. Then, under the control of the system controller 100, the special operation such as the search etc., which is operation-inputted, is executed (step S13). Incidentally, at the time of executing this, in advance of reproducing the substantial video information etc., the second operation prohibit flag included in the VOBU related to the start of the special operation (e.g. the VOBU at the search destination) is reproduced and confirmed. As long as the reproducing apparatus S2 is operating normally, there is no need referring to the second operation prohibit flag, and this second operation prohibit flag has a wholly protective purpose. Namely, even if the optical pickup 80 tries to perform the special operation within the PGC, in which the special operation such as the search etc. is prohibited by the first operation prohibit information, due to the error in the reproducing apparatus S2 etc., it is still possible to stop this special operation on the basis of the second operation prohibit flag included in the reproduced PCI before reproducing the substantial video information etc. by reproducing the PCI at first.

In this manner, according to the present embodiment, by referring to the first operation prohibit flag in advance of the movement of the optical pickup 80, it is possible to speedily and certainly prevent or stop the special operation of the reproducing apparatus S2 regardless of the search destination or the like, which is very advantageous.

Further, according to the present embodiment, by referring to the second operation prohibit flag included in each of the VOBU, which is the unit able to be accessed, even if it becomes unknown in which PGC the optical pickup 80 is currently located due to an erroneous operation of the reproducing apparatus S2, it is still possible to prevent the reproducing apparatus S2 from performing the special operation prohibited as for that PGC in a real time manner (i.e. immediately before the optical pickup 80 starts the reproduction). Since the PCI data including the second operation prohibit flag is reproduced every 0.5 seconds in the normal reproduction, for example, the operation prohibiting control by use of the second operation prohibit flag can be performed rather promptly.

In this way, by the first and second operation prohibit flags, for example, it is possible to certainly prevent such an action that the "correct answer" is watched before the "question" is watched in the reproduction of the interactive educational program or quiz program, and it is also possible to prevent such an action that the slow reproduction is performed in the shooting game, for example.

Nextly, the prohibiting process of the stream selection of the audio or sub picture streams in the reproducing apparatus S2 is explained with reference to FIG. 16.

Figure 16:
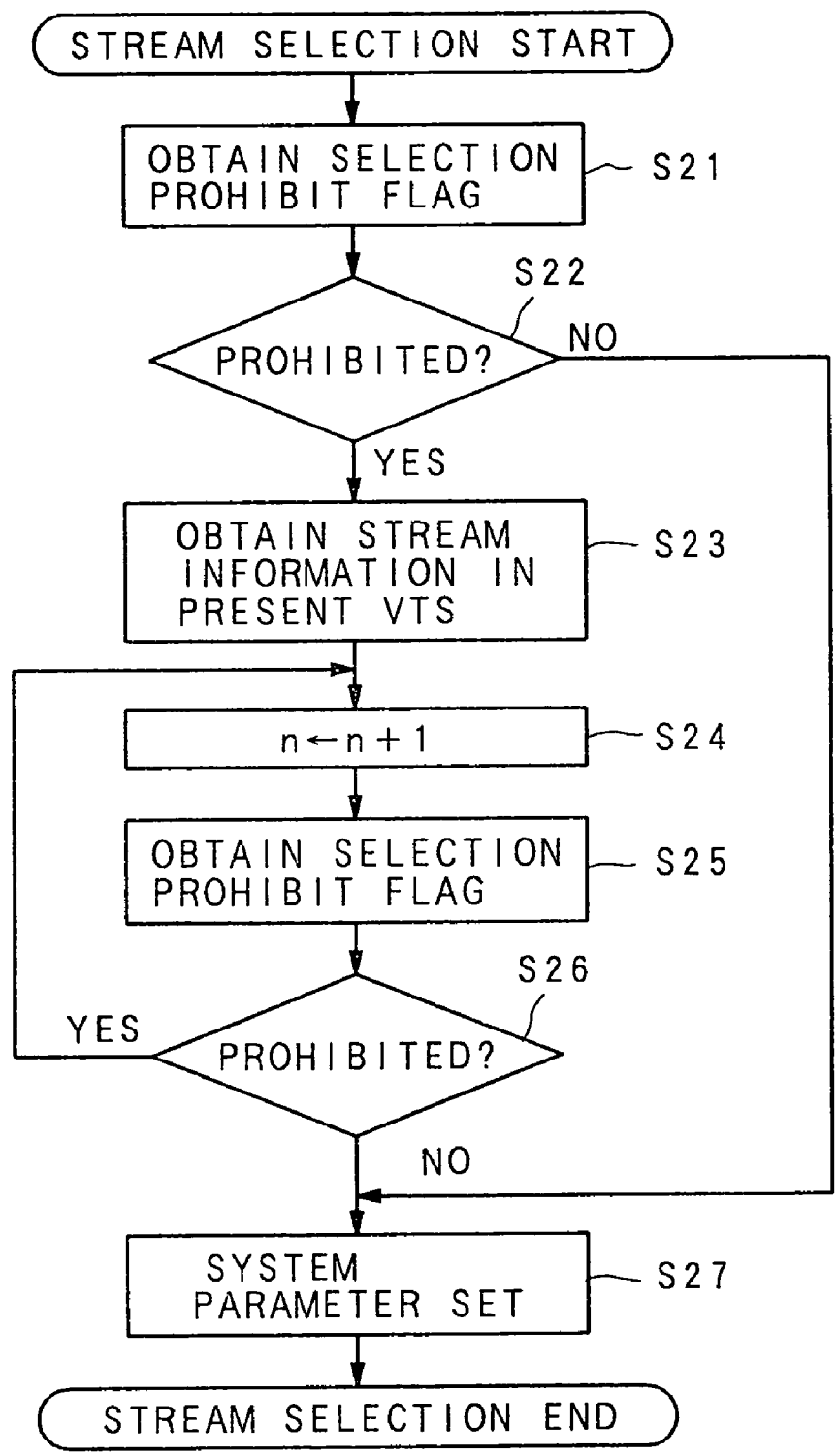
FIG. 16 is a flow chart showing a stream selection of the information reproducing apparatus in FIG. 12.

In FIG. 16, the system controller 100 memorizes the stream number n as a default value beforehand. At the time of stream selection, at first, the selection prohibit flag corresponding to the stream number n is obtained from the stream selection prohibit information (see FIG. 9) (step S21), and it is judged whether or not the stream number n is prohibited by the first or second selection prohibit flag (step S22). Here, if it is prohibited (step S22: YES), the information indicating how many streams exist in the pertinent VTS is obtained (step S23). Then, the value "1" is added to the stream number n so as to be "n+1" (step S24), and then the selection prohibit flag corresponding to the stream number n+1 is obtained again from the stream selection prohibit information (see FIG. 9) (step S25). Then, it is judged whether or not the stream n+1 is prohibited by the first or second selection prohibit flag (step S26). Here, if it is prohibited (step S25: YES), the flow returns to the step S24, so that the process with respect to the next stream number is repeated.

On the other hand, if it is not prohibited at the step S22 or S26 (step S22: NO, or step S26: NO), the parameter of the system controller 100 is set to the current stream number, so that the stream having the current stream number is selected (step S27).

As explained above, as for the stream which selection is prohibited by the first or second selection prohibit flag, since the audience does not have any chance to select it, it is possible to let the audience execute the stream selection in accordance with the author's intention and the parameter settings of the reproducing apparatus S2 and so on. Further, by controlling the display unit not to display the stream which selection is prohibited on the selection menu, the audience can easily execute the stream selection without recognizing which stream selection is prohibited by the author.

As described above in detail, according to the present embodiment, it is possible for the author to easily add some restriction to the reproducing operation through the DVD and to easily add some restriction to the selectable streams, and it is further possible for the audience to perform the desirable interactive reproduction by use of the DVD in which the appropriate restriction is added in this manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus for recording information on an information record medium, characterized in that the information recording apparatus comprises:
    an object information generating device which generates object information to be recorded;
    a management information generating device which generates management information including a plurality of first operation prohibit information each indicating whether a predetermined operation by the reproducing apparatus in response to a user's operation is prohibited during presentation of the object information to be controlled by the management information, each of the plurality of first operation prohibit information having a same bit length; and
    a record device which records the object information and the management information on the information record medium.

2. The apparatus according to claim 1, wherein the object information is so recorded as to have a hierarchical logical structure comprising a plurality of logical layers, and
    wherein the management information is provided for a certain logical layer in the hierarchical logical structure.

3. The apparatus according to claim 1, wherein a position of each of the plurality of first operation prohibit information among the plurality of first operation prohibit information corresponds to a specific operation.

4. The apparatus according to claim 1, wherein each of the plurality of first operation prohibit information has 1 bit length.

5. The apparatus according to claim 1, wherein the object information is divided into a plurality of first data groups,
    the apparatus further comprising a control information generating device which generates control information for each of the plurality of first data groups, the control information including a plurality of second operation prohibit information, each indicating whether a predetermined operation by the reproducing apparatus in response to a user's operation is prohibited.

6. The apparatus according to claim 5, wherein each of the plurality of second operation prohibit information has a same bit length.

7. The apparatus according to claim 6, wherein each of the plurality of second operation prohibit information has the same bit length as the first operation prohibit information.

8. The apparatus according to claim 1, wherein the plurality of first operation prohibit information is recorded as one piece of information which has an empty area at its heading.

9. An information reproducing apparatus for reproducing information from an information record medium comprising:
    object information which consists of a plurality of object information streams; and
    management information including a plurality of first operation prohibit information each indicating whether a predetermined operation by the reproducing apparatus in response to a user's operation is prohibited during presentation of the object information to be controlled by the management information,
    wherein each of the plurality of first operation prohibit information has a same bit length,
    characterized in that the apparatus comprises:
    a reading device which reads information recorded on the record medium;
    a reproduction device which reproduces the information read by the reading device;
    an instruction device which instructs the predetermined operation;
    a detection device which detects the management information from the information read by the reading device;
    a control device which prohibits the predetermined operation when the first operation prohibit information indicates that the operation is prohibited; and
    a generating device which generates an indication of prohibition of the instructed operation.

10. The apparatus according to claim 9, wherein the object information has a hierarchical logical structure comprising a plurality of logical layers, and
    wherein the management information is provided for a certain logical layer in the hierarchical logical structure.

11. The apparatus according to claim 9, wherein a position of each of the plurality of first operation prohibit information among the plurality of first operation prohibit information corresponds to a specific operation.

12. The apparatus according to claim 9, wherein each of the plurality of first operation prohibit information has 1 bit length.

13. The apparatus according to claim 9, wherein the medium further comprises control information provided for a first data group,
    wherein the control information includes a plurality of second operation prohibit information, each indicating whether a predetermined operation by the reproducing apparatus in response to a user's operation is prohibited, and
    wherein the control device prohibits the predetermined operation when the second operation prohibit information indicates that the operation is prohibited.

14. The apparatus according to claim 13, wherein each of the plurality of second operation prohibit information has a same bit length.

15. The apparatus according to claim 14, wherein each of the plurality of second operation prohibit information has the same bit length as the first operation prohibit information.

16. The apparatus according to claim 9, wherein the plurality of first operation prohibit information is recorded as one piece of information which has an empty area at its heading.

17. A method for reproducing information from an information record medium comprising:
    object information which consists of a plurality of object information streams; and
    management information including a plurality of first operation prohibit information each indicating whether a predetermined operation by the reproducing apparatus in response to a user's operation is prohibited during presentation of the object information to be controlled by the management information, wherein each of the plurality of first operation prohibit information has a same bit length, characterized in that the method comprises steps of:
reading information recorded on the record medium;
reproducing the information read at the reading step;
receiving instruction of the predetermined operation;
detecting the management information from the information read at the reading step;
prohibiting the predetermined operation when the first operation prohibit information indicates that the instructed operation is prohibited; and
generating an indication of prohibition of the instructed operation.

18. The method according to claim 17, wherein the object information has a hierarchical logical structure comprising a plurality of logical layers, and
wherein the management information is provided for a certain logical layer in the hierarchical logical structure.

19. The method according to claim 17, wherein a position of each of the plurality of first operation prohibit information among the plurality of first operation prohibit information corresponds to a specific operation.

20. The method according to claim 17, wherein each of the plurality of first operation prohibit information has 1 bit length.

21. The method according to claim 17, wherein the medium further comprises control information provided for a first data group,
wherein the control information includes a plurality of second operation prohibit information, each indicating whether a predetermined operation by the reproducing apparatus in response to a user's operation is prohibited, and
wherein the method further comprises a step of prohibiting the predetermined operation when the second operation prohibit information indicates that the instructed operation is prohibited.

22. The method according to claim 21, wherein each of the plurality of second operation prohibit information has a same bit length.

23. The method according to claim 22, wherein each of the plurality of second operation prohibit information has the same bit length as the first operation prohibit information.

24. The method according to claim 17, wherein the plurality of first operation prohibit information is recorded as one piece of information which has an empty area at its heading.

* * * * *